(12) United States Patent
Roussel et al.

(10) Patent No.: US 6,925,553 B2
(45) Date of Patent: Aug. 2, 2005

(54) STAGGERING EXECUTION OF A SINGLE PACKED DATA INSTRUCTION USING THE SAME CIRCUIT

(75) Inventors: Patrice Roussel, Portland, OR (US); Glenn J. Hinton, Portland, OR (US); Shreekant S. Thakkar, Portland, OR (US); Brent R. Boswell, Beaverton, OR (US); Karol F. Menezes, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 92 days.

(21) Appl. No.: 10/689,291

(22) Filed: Oct. 20, 2003

(65) Prior Publication Data

US 2004/0083353 A1 Apr. 29, 2004

Related U.S. Application Data

(63) Continuation of application No. 10/164,774, filed on Jun. 6, 2002, now Pat. No. 6,694,426, which is a continuation of application No. 09/805,280, filed on Mar. 13, 2001, now Pat. No. 6,425,073, which is a continuation of application No. 09/053,004, filed on Mar. 31, 1998, now Pat. No. 6,230,257.

(51) Int. Cl.[7] .............................................. G06F 9/302
(52) U.S. Cl. .................................................... 712/245
(58) Field of Search ........................... 712/245, 22, 300

(56) References Cited

U.S. PATENT DOCUMENTS

| | | | |
|---|---|---|---|
| 3,675,001 A | 7/1972 | Singh | 235/175 |
| 3,723,715 A | 3/1973 | Chen et al. | 235/175 |
| 3,900,724 A | 8/1975 | McIver et al. | 235/164 |
| 3,941,990 A | 3/1976 | Rabasse | 235/176 |
| 4,542,476 A | 9/1985 | Nagafuji | 364/749 |
| 4,677,582 A | 6/1987 | Nagafuji | 708/518 |
| 4,760,545 A | 7/1988 | Inagami et al. | 712/4 |
| 4,811,269 A | 3/1989 | Hirose et al. | 708/627 |
| 4,890,218 A | * 12/1989 | Bram | 712/210 |
| 4,945,479 A | 7/1990 | Rusterholz et al. | 712/3 |

(Continued)

FOREIGN PATENT DOCUMENTS

| | | | |
|---|---|---|---|
| GB | 9907221.7 | 10/1999 | G06F/9/302 |
| GB | 2 339 040 A | 12/2000 | |
| WO | WO 97/08608 | 3/1997 | G06F/7/00 |
| WO | WO 97/22921 | 6/1997 | G06F/9/00 |
| WO | WO 97/22923 | 6/1997 | G06F/9/34 |
| WO | WO 97/22924 | 6/1997 | G06F/9/34 |
| WO | WO 97/23821 | 7/1997 | |
| WO | WO 99/50740 | 10/1999 | |

OTHER PUBLICATIONS

Santoro, Mark; Design and Clocking of VLSI Multipliers. Technical Report No. CSL–TR–89–397, Oct. 1989. pp. i–xii and 1–118.

(Continued)

Primary Examiner—Eric Coleman
(74) Attorney, Agent, or Firm—Blakely, Sokoloff, Taylor & Zafman LLP

(57) ABSTRACT

A method and apparatus are disclosed for staggering execution of an instruction. According to one embodiment of the invention, a macro instruction specifying an operation, and specifying a first and a second data operand in first and second registers, respectively, is received. The macro instruction is then split into a first micro instruction and a second micro instruction, the first micro instruction specifying the operation on a first corresponding segment including a first portion of the first data operand and a first portion of the second data operand, and the second micro instruction specifying the operation on a second corresponding segment including a second portion of the first data operand and a second portion of the second data operand. The first and second micro instructions are then executed.

26 Claims, 8 Drawing Sheets

U.S. PATENT DOCUMENTS

| | | | |
|---|---|---|---|
| 4,972,362 A | 11/1990 | Elkind et al. | 708/632 |
| 4,985,848 A | 1/1991 | Pfeiffer et al. | 345/505 |
| 5,001,662 A | 3/1991 | Baum | 708/625 |
| 5,047,975 A | 9/1991 | Patti et al. | 708/706 |
| 5,081,698 A | 1/1992 | Kohn | 345/422 |
| 5,126,964 A | 6/1992 | Zurawski | 708/625 |
| 5,161,247 A | 11/1992 | Murakami et al. | 712/36 |
| 5,189,636 A | 2/1993 | Patti et al. | 708/706 |
| 5,210,711 A | 5/1993 | Rossmere et al. | 364/786 |
| 5,241,493 A | 8/1993 | Chu et al. | 708/501 |
| 5,303,355 A | 4/1994 | Gergen et al. | 712/241 |
| 5,311,508 A | 5/1994 | Buda et al. | 370/60 |
| 5,327,369 A | 7/1994 | Ashkenazi | 708/710 |
| 5,390,135 A | 2/1995 | Lee et al. | 708/518 |
| 5,426,598 A | 6/1995 | Hagihara | 364/759 |
| 5,515,520 A | 5/1996 | Hatta et al. | 708/550 |
| 5,579,253 A | 11/1996 | Lee et al. | 708/625 |
| 5,590,365 A | 12/1996 | Ide et al. | 712/218 |
| 5,606,677 A | 2/1997 | Balmer et al. | 712/208 |
| 5,642,306 A | 6/1997 | Mennemeier et al. | 708/625 |
| 5,673,427 A | 9/1997 | Brown et al. | 395/595 |
| 5,701,508 A | 12/1997 | Glew et al. | 712/23 |
| 5,721,892 A | 2/1998 | Pelog et al. | 712/210 |
| 5,742,840 A | 4/1998 | Hansen et al. | 712/210 |
| 5,765,037 A | 6/1998 | Morrison et al. | 713/502 |
| 5,778,419 A | 7/1998 | Hansen et al. | 711/112 |
| 5,793,661 A | 8/1998 | Dulong et al. | 364/750.5 |
| 5,794,060 A | 8/1998 | Hansen et al. | 712/1 |
| 5,794,061 A | 8/1998 | Hansen et al. | 712/1 |
| 5,802,336 A * | 9/1998 | Peleg et al. | 712/200 |
| 5,806,049 A | 9/1998 | Petruzzi | 705/36 |
| 5,809,321 A | 9/1998 | Hansen et al. | 712/1 |
| 5,819,101 A | 10/1998 | Peleg et al. | 712/22 |
| 5,822,603 A | 10/1998 | Hansen et al. | 712/1 |
| 5,835,392 A * | 11/1998 | Dulong et al. | 708/404 |
| 5,852,726 A | 12/1998 | Lin et al. | 395/376 |
| 5,870,619 A | 2/1999 | Wilkinson et al. | 712/20 |
| 5,880,983 A | 3/1999 | Elliott et al. | 708/501 |
| 5,883,824 A | 3/1999 | Lee et al. | 708/445 |
| 5,884,071 A | 3/1999 | Kosaraju | 712/245 |
| 5,936,782 A | 8/1999 | Nomura et al. | 364/754.03 |
| 5,953,241 A | 9/1999 | Hansen et al. | 708/501 |
| 5,983,257 A | 11/1999 | Dulong et al. | 708/603 |
| 6,006,318 A | 12/1999 | Hansen et al. | 712/28 |
| 6,018,351 A | 1/2000 | Mennemeier et al. | 345/437 |
| 6,035,387 A | 3/2000 | Hsu et al. | 712/210 |
| 6,041,403 A | 3/2000 | Parker et al. | 712/210 |
| 6,122,725 A | 9/2000 | Roussel et al. | 712/200 |
| 6,154,831 A * | 11/2000 | Thayer et al. | 712/208 |
| 6,178,482 B1 | 1/2001 | Sollars | 711/129 |
| 6,192,467 B1 | 2/2001 | Abdallah et al. | 712/222 |
| 6,230,253 B1 | 5/2001 | Roussel et al. | 712/22 |
| 6,230,257 B1 | 5/2001 | Roussel et al. | 712/221 |
| 6,233,671 B1 | 5/2001 | Abdallah et al. | 712/221 |
| 6,260,137 B1 | 7/2001 | Fleck et al. | 712/225 |
| 6,295,599 B1 | 9/2001 | Hansen et al. | 712/32 |
| 6,378,060 B1 | 4/2002 | Hansen et al. | 712/32 |
| 6,385,634 B1 | 5/2002 | Peleg et al. | 708/490 |
| 6,470,370 B2 | 10/2002 | Fischer et al. | 708/622 |
| 6,502,117 B2 | 12/2002 | Golliver et al. | 708/490 |
| 6,584,482 B1 | 6/2003 | Hansen et al. | 708/523 |
| 6,643,765 B1 | 11/2003 | Hansen et al. | 712/32 |
| 6,725,356 B2 | 4/2004 | Hansen et al. | 712/210 |

OTHER PUBLICATIONS

Santoro, Mark, et al.; SPIM: A Pipelined 64X64 bit Interative Multiplier, IEEE Journal of Solid–State Circuits, vol. 24, No. 2, Apr. 1989. pp. 487–493.

Santoro, Mark, et al.; Session II: High–Speed Microprocessor. WAM 2.6: A Pipleined 64X64b Interative Array Multiplier. 1998 IEEE International Solid State Circuits Conference. pp. 36–37 and 290.

BIT Preliminary, Bipolar Integrated Technology, Inc. B3110/B3120;B2110/B2120 Floating Point Chip Set. pp. 1–40.

Eklind, Bob, et al. A SUB 10 nS Bipolar 64 Bit Integrated/Floating Point Processor Implemented On Two Circuits. IEEE 1987 BCTM, pp. 91–95.

Leibowitz, Bob; et al., System Design; ECL gains ground in battle against CMOS. Computer Design; Apr. 1, 1987. pp. 9–15.

IBM. TBD: Double Speed, Single Precision Vector Register Organization Using Double Port Chips. Feb. 1981. Pp.1–6.

Farmwald, P. Michael; High Bandwidth Evaluation of Elementary Functions, S–1 Project. IEEE 1981. pp. 139–142.

Farmwald, P. Michael; On the Design of High Performance Digital Arithmetic Units. UCRL–53190. Aug. 1981. pp. i–vii and 1–95.

Grimes et al.; 64–Bit Processor. The Intel i860 64–Bit Processor: A General–Purpose CPU with 3D Graphics Capabilities. Jul. 1989. pp. 85–94.

Ide, et al.; A 320–MFLOPS CMOS Floating–Point Processing Unit for Superscalar Processors. IEEE Journal of Solid State Circuits, vol. 28, No. 3, Mar. 1993. pp. 352–361.

Lino, et al.; ISSCC 92 Session 6/Microprocessors/ TA 6.5: A 289MFLOPS Single–Chip Supercomputer. 1992 IEEE International Solid State Circuits Conference. pp. 112–113.

Kohn, et al.; Introducing the Intel i860 64 Bit Microprocessor, Intel Corp. Aug. 1989. pp. 15–30.

Lee, Ruby et al.; Accelerating Multimedia with Enhanced Microprocessors. Hewlett–Packard. IEEE Micro, Apr. 1995. pp. 22–32.

Lee, Ruby B.; Realtime MPEG Video via Software Decompression on a PA–RISC Processor. 1995 IEEE, pp. 186–192.

Manferdelli, John L. et al.; Signal Processing Aspects of the S–1 Microprocessor Project. UCRL–84658. Jul. 28, 1980. pp. 1–8.

Spaderna, D., et al.; An Integrated Floating Point Vector Processor for DSP and Scientific Computing. SHARP Microelectronics Technology Inc. IEEE 1989. pp. 8–13.

Undy, Steve, et al.; A Low–Cost Graphics and Multimedia Workstation Chip Set. Apr. 1994, IEEE micro, pp. 10–22.

"MIPS Digital Media Extension", pp. C1–C40.

"MIPS Extension for Digital Media with 3D", MIPS Technology, Inc., Mar. 12, 1997, pp. 1–26.

"64–Bit and Multimedia Extensions in the PA–RISC 2.0 Architecture", Helett Packard, downloaded form Website rblee@cup.hp.com.huck@cup.hp.com. pp. 1–18.

"The VIS TM Instruction Set", Sun Microsystems, Inc., 1997 pp. 1–2.

"ULTRASPARC TM The Visual Instructions Set (VIStm): On Chip Support for New–Media Processing", Sun Microsystems, Inc., 1996, pp. 1–7.

ULTRASPARC TM and New Media Support Real–Time MPEG2 Decode with the Visual Instruction Set (VIS TM), Sun Microsystems, Inc., 1996, pp. 1–8.

ULTRASPARC TM Ultra Port Architecture (UPA): The New Media System Architecture, Sun Microsystems, Inc., 1996, pp. 1–4.

ULTRASPARC TM Turbocharges Network Operations on New Media Computing, Sun Microsystem, Inc., 1996, pp. 1–5.

The ULTRASPARC Processor–Technology White Paper, Sun Microsystems, Inc., 1995, 37 pages.

AMD–3D TM Technology Manual, Advanced Micro Devices, Feb. 1998.

Hansen, Craig, Architecture of a Broadband Mediaprocessor, Micro Unity Systems Engineering, Inc., 1996, pp. 334–354.

Levinthal, Adam et al., Parallel Computers for Graphics Applications, Pixar, San Rafael, CA., 1987, pp. 193–198.

Levinthal, Adam et al. Porter, Thomas, "Chap–A SIMD Graphics Processor", Computer Graphics Project, Lucasfilm Ltd., 1984, pp. 77–82.

Wang, Mangaser, Shrinivan, A Processor Architecture for 3D Graphics Calculations, Computer Motion, Inc., pp. 1–23.

Visual Instructions Set (VIS TM), User's Guide, Sun Microsystems, Inc., version 1.1 Mar. 1997.

ULTRASPARC TM Turbocharges Network Operations on New Media Computing, Sun Microsystem, Inc., 1996, pp. 1–5.

The ULTRASPARC Processor–Technology White Paper, Sun Microsystems, Inc., 1995, 37 pages.

Abbott et al., "Broadband Algorithums with the Micro Unity Mediaprocessor", Proceedings of COMPCON 1996, 349–354.

Hayes et al., "MicroUnity Software Development Environment", Proceedings of COMPCON 1996, 341–348.

"64–Bit and Multimedia Extensions in the PA–RISC 2.0 Architecture", Helett Packard, downloaded from Website rblee@cup.hp.com.huck@cup.hp.com, pp. 1–18.

"TM 1000 Preliminary Data Book", Philips Semiconductors, 1997.

"21164 Alpha TM Microprocessor Data Sheet", Samsung Eleectronics, 1997.

"Silicon Graphics Introduces Enhanced MIPS ® Architecture to lead the Interactive Digital Revolution, Silicon Graphics", Oct. 21, 1996, downloaded form the Website webmaster @ www.sgi.com, pp. 1–2.

"Silicon Graphics Introduces Compact MIPS ® RISC Microprocessor Code for High Performance at a low Cost", Oct. 21, 1996, downloaded from the Website webmaster @ www.sgi.com, pp. 1–2.

Killian, Earl, "MIPS Extension for Digital Media", Silicon Graphics, pp. 1–10.

"MIPS V Instruction Set", pp B1–B37.

"MIPS Digital Media Extension", pp. C1–C40.

"MIPS Extension for Digital Media with 3D", MIPS Technologies, Inc., Mar. 12, 1997, pp. 1–26.

* cited by examiner

STAGGERING EXECUTION OF A SINGLE PACKED DATA INSTRUCTION USING THE SAME CIRCUIT

CROSS-REFERENCE TO RELATED APPLICATIONS

This is a continuation application of U.S. application Ser. No. 10/164,774, filed on Jun. 6, 2002 now U.S. Pat. No. 6,694,426, which is a continuation of U.S. application Ser. No. 09/805,280, filed on Mar. 13, 2001, now U.S. Pat. No. 6,425,073, issued on Jul. 23, 2002, which is a continuation of U.S. application Ser. No. 09/053,004 filed on Mar. 31, 1998, now U.S. Pat. No. 6,230,257, issued on May 8, 2001.

BACKGROUND OF THE INVENTION

1. Field of the Invention

Embodiments of the present invention relate to computer systems and more particularly, to staggering execution of an instruction.

2. Description of Related Art

Multimedia applications such as 2D/3D graphics, image processing, video compression/decompression, voice recognition algorithms and audio manipulation, require performing the same operation on a large number of data items (referred to as "data parallelism") which may be represented in a small number of bits. For example, graphical and sound data are typically represented by 32-bits in floating point format and 8 or 16 bits in integer format. Floating point numbers are represented in a computer system in the form of a digit string including three components: a sign, an exponent (indicating the magnitude of the number) and a significand or mantissa (indicating the value of the fractional portion of the number). Each type of multimedia application implements one or more algorithms, where each algorithm may require a number of floating point or integer operations, such as ADD or MULTIPLY (hereafter MUL).

Single Instruction Multiple Data (SIMD) technology has enabled a significant improvement in multimedia application performance. SIMD technology provides for a single macro instruction, the execution of which causes a processor to perform the same operation on multiple data items in parallel. This technology is especially suited to systems that provide packed data formats. A packed data format is one in which the bits in a register are logically divided into a number of fixed-sized data elements, each of which represents a separate value. For example, a 64-bit register may be broken into four 16-bit elements, each of which represents a separate 16-bit value. SIMD instructions then separately manipulate each element in these packed data types in parallel. For example, a SIMD packed ADD instruction adds together corresponding data elements from a first packed data operand and a second packed data operand, as illustrated in FIG. 1. More specifically, the corresponding data elements for X and Y are added to result in Z, i.e. $X_0+Y_0=Z_0$, $X_1+Y_1=Z_1$, $X_2+Y_2=Z_2$ and $X_3+Y_3=Z_3$.

FIGS. 2A–2B illustrate a current processor implementation of an arithmetic logic unit (ALU) that can be used to execute SIMD instructions. The ALU of FIG. 2A includes the circuitry necessary to perform operations on the full width of the operands (i.e. all of the data elements). FIG. 2A also shows that the ALU contains two different types of execution units for respectively performing different types of operations (e.g. certain ALUs use separate units for performing ADD and MUL operations). The four ADD execution units and four MUL execution units are respectively capable of operating as four separate ADD execution units and four separate MUL execution units. Alternatively, the ALU may contain multiple Floating Point Multiply Accumulate (FMAC) units, each capable of performing more than a single type of operation. The following examples assume the use of ADD and MUL execution units, but other execution units such as FMAC may also be used.

Thus, as illustrated in FIG. 2B, if at time T, an "ADD X, Y" instruction is issued via issue port 105, each of the four ADD execution units performs an ADD on the separate packed data elements. The four MUL units remain idle during time T. At time T+1, assuming an "ADD A, B" instruction is issued, each of the four ADD execution units once again performs an ADD on the separate packed data elements, while the four MUL units once again remain idle. At time T+2, if a "MUL X, Y" instruction is issued, then each of the four MUL units separately performs a MUL on one of the four packed data elements, while the four ADD execution units remain idle. Finally, at time T+3, if an "ADD S, T" instruction is issued, then each of the four ADD execution units perform ADDs while the four MUL units remain idle.

The implementation described above can require a significant amount of duplicated hardware components and is inefficient in utilizing the hardware components (namely the ADD and MUL execution units). At any given time, one execution unit remains idle while the second execution unit is active.

BRIEF DESCRIPTION OF THE DRAWINGS

Present embodiments of the invention are described by way of example and not by way of limitation with reference to the figures of the accompanying drawings in which like reference numerals refer to similar elements and in which.

DETAILED DESCRIPTION

In one aspect of embodiments of invention is a method and apparatus for staggering execution of an instruction. In the following detailed description, numerous specific details are set forth in order to provide a thorough understanding of the various embodiments of the present invention. It will be apparent to one of ordinary skill in the art that these specific details need not be used to practice various embodiments of the present invention. In other instances, well-known structures, interfaces, and processes have not been shown in detail in order not to unnecessarily obscure various embodiments of the present invention.

Overview

Figure 3:
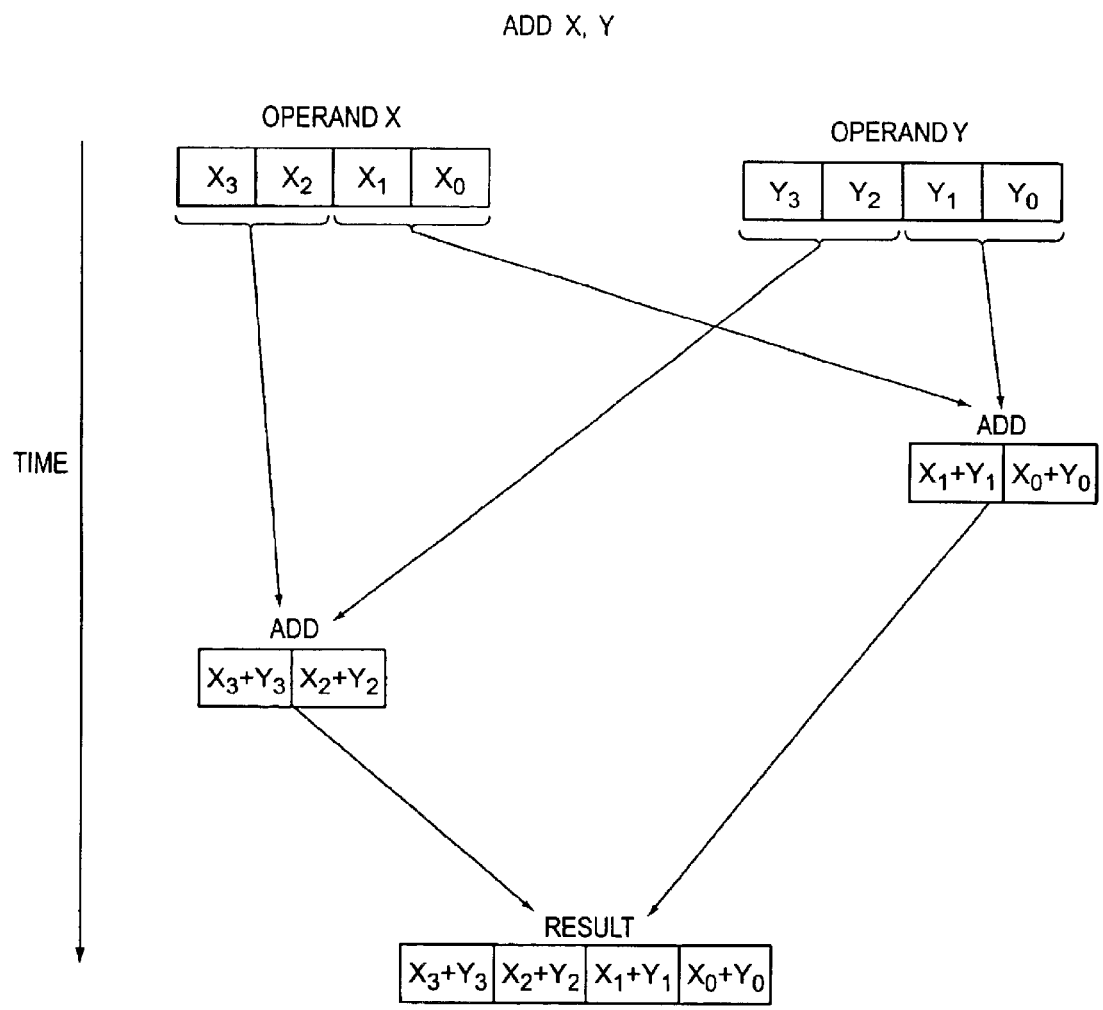
FIG. 3 illustrates conceptually an operation being performed on the operands in a "staggered" manner.

FIG. 3 illustrates conceptually an operation being performed on operands in a "staggered" manner. Although one embodiment of the present invention assumes a packed data operand format, the following description is also applicable to performing certain operations (e.g. logical operations) on a scalar data format. "Staggered execution" in the context of this embodiment refers to the process of dividing an instruction's operands into separate segments and sequentially processing each segment using the same hardware. The segments are sequentially processed by introducing a delay into the processing of the subsequent segments. As illustrated in FIG. 3, the packed data operands of an ADD instruction are divided into a "high order segment" (data elements 3 and 2) and a "low order segment" (data elements 1 and 0). The low order segment is processed while the high order segment is delayed. Subsequently, the high order segment is processed and the full-width result is obtained. Additionally, although the following embodiments are described as having only ADD and MUL execution units, other types of execution units such as FMAC units may also be used.

While there are a number of different ways in which the staggered execution of instructions can be achieved, the following sections describe two exemplary embodiments to illustrate the invention. In particular, both of the described exemplary embodiments receive the same macro instructions specifying logical registers containing 128 bit operands. The term logical register is used herein to refer to the concept of the manner in which instructions specify a storage area that contains a single operand. Thus, a logical register can be implemented in hardware using any number of well known techniques, including a dedicated physical register, one or more dynamically allocated physical register using a register renaming mechanism (described in further detail below), etc..

In the first exemplary embodiment, each macro instruction specifying logical registers containing 128 bit operands causes the full-width of the operands to be accessed from the physical registers. Subsequent to accessing the full-width operands from the registers, the operands are divided into the low and high order segments (e.g., using latches and multiplexers) and sequentially executed using the same hardware. The resulting half-width results are collected and simultaneously written to a single logical register.

In contrast, in the second exemplary embodiment each macro instruction specifying logical registers containing 128 bit operands is divided into at least two micro instructions that each operate on only half of the operands. Thus, the operands are divided into a high and low order segment and each micro instruction separately causes only half of the operands to be accessed from the registers. This type of a division is possible in a SIMD architecture because each of the operands is independent from the other. While implementations of the second embodiment can execute the micro instructions in any order (either an in order or an out of order execution model), the micro instructions respectively causes the operation specified by the macro instruction to be independently performed on the low and high order segments of the operands. In addition, each micro instruction causes half of the resulting operand to be written into the single logical register specified by the macro instruction.

While embodiments are described in which 128 bit operands are divided into two segments, alternative embodiments could use larger or smaller operands and/or divide those operands into more than two segments. In addition, while two exemplary embodiments are described for performing staggered execution, alternative embodiments could use other techniques.

First Exemplary Embodiment

Figure 4A:
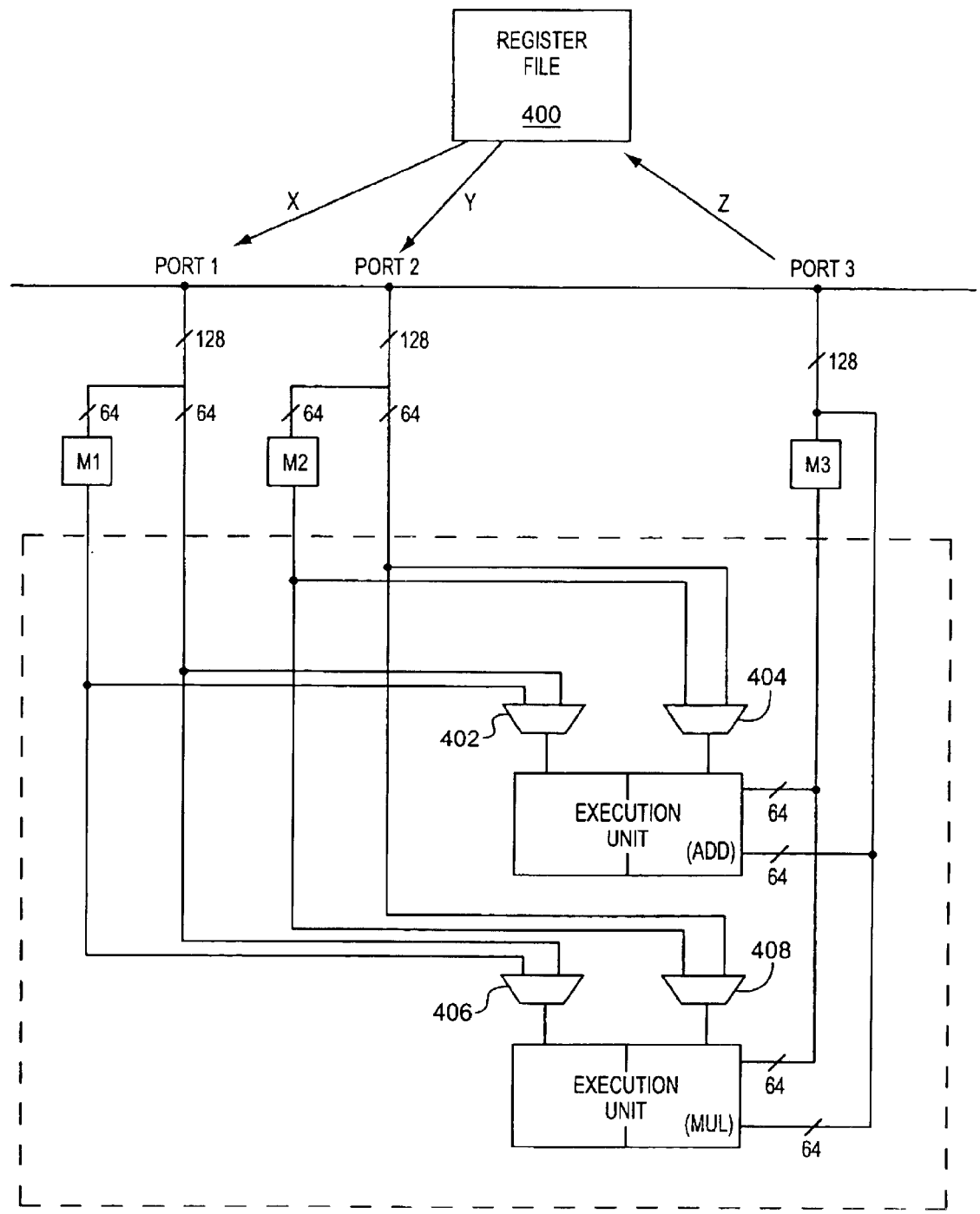
FIG. 4A conceptually illustrates circuitry within a processor that accesses full width operands from the logical registers but that performs operations on half of the width of the operands at a time.

FIG. 4A conceptually illustrates circuitry within a processor according to a first embodiment that accesses full width operands from the logical registers but that performs operations on half of the width of the operands at a time. This embodiment assumes that the processor execution engine is capable of processing one instruction per clock cycle. By way of example, assume the following sequence of instructions is executed: ADD X, Y; MUL A, B. At time T, 128-bits of X and 128-bits of Y are each retrieved from their respective registers via ports 1 and 2. The lower order data segments, namely the lower 64 bits, of both X and Y are passed into multiplexers 402 and 404 and then on to the execution units for processing. The higher order data segments, the higher 64 bits of X and Y are held in delay elements M1 and M2. At time T+1, the higher order data segments of X and Y are read from delay elements M1 and M2 and passed into multiplexers 402 and 404 and then on to the execution units for processing. The delay mechanism of storing the higher order data segments in delay elements M1 and M2 thus allows the 64-bit hardware to process the 128-bits of data. The low order results from the execution unit are held in delay element M3 until the high order results are ready. The results of both processing steps are then written back to register file 400 via port 3.

At time T+1, the MUL instruction may also have been started. Thus, at time T+1, 128-bits of A and B may each have been retrieved from their respective registers via ports 1 and 2. The lower order data segments, namely the lower 64-bits, of both A and B may be passed into multiplexers 406 and 408. After the higher order bits of X and Y are removed from delay elements M1 and M2 and passed into multiplexers 406 and 408, the higher order bits of A and B may be held in storage in delay elements M1 and M2. The results of both processing steps is written back to register file 400 via port 3.

Thus, according to an embodiment of the present invention, execution units are provided that contain only half the hardware (e.g. two single precision ADD execution units and two single precision MUL execution units), instead of the execution units required to process the full width of the operands in parallel as found in a current processor. This embodiment takes advantage of statistical analysis showing that multimedia applications utilize approximately fifty percent ADD instructions and fifty percent MUL instructions. Based on these statistics, this embodiment assumes that multimedia instructions generally follow the following pattern: ADD, MUL, ADD, MUL, etc. By utilizing the ADD and MUL execution units in the manner described above, the present embodiment provides for an optimized use of the execution units, thus enabling comparable performance to the current processor, but at a lower cost.

Figure 1:
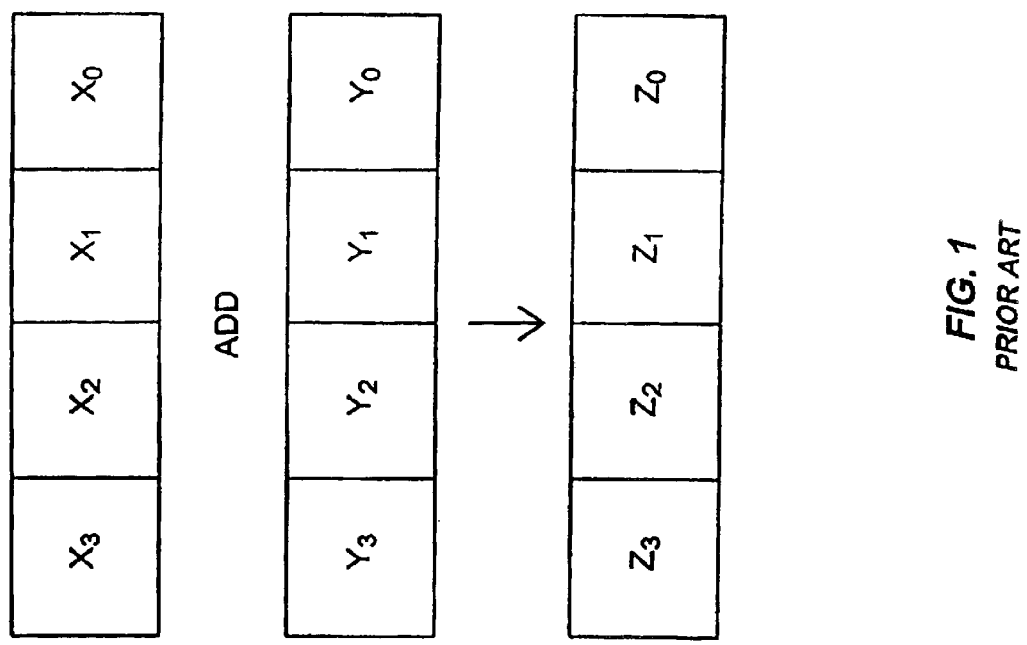
FIG. 1 illustrates a SIMD packed ADD instruction adding together corresponding data elements from a first packed data operand and a second packed data operand.
Figure 2:
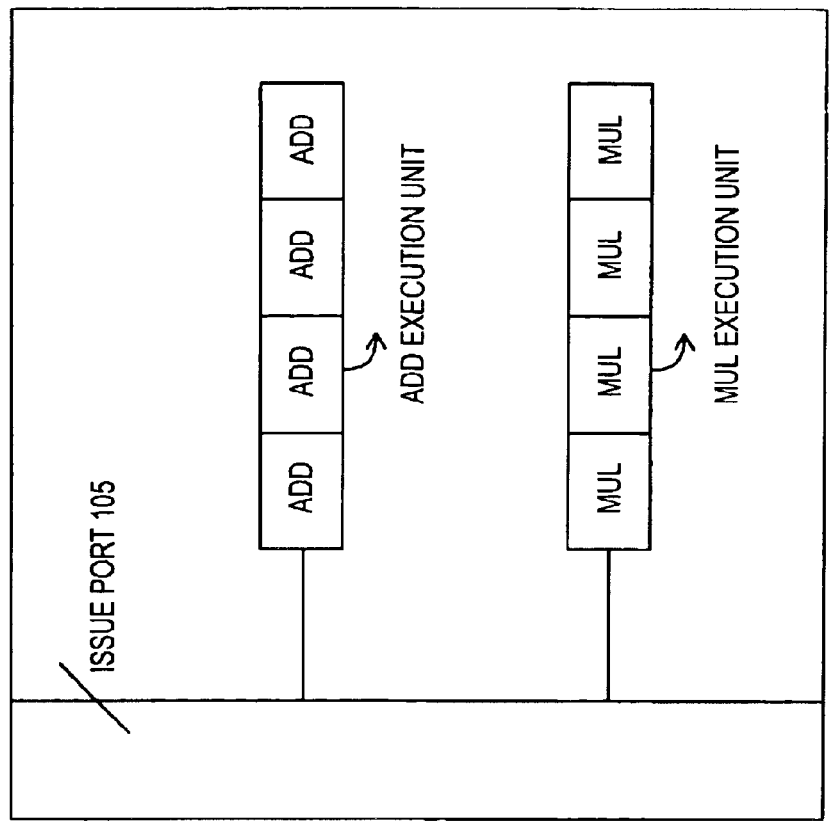
FIG. 2A illustrates four ADD execution units and four MUL execution units according to a current processor implementation of SIMD.
FIG. 2B illustrates a current processor implementation of a SIMD ADD and MUL utilizing the four ADD execution units and four MUL execution units of FIG. 2A.
Figure 4B:
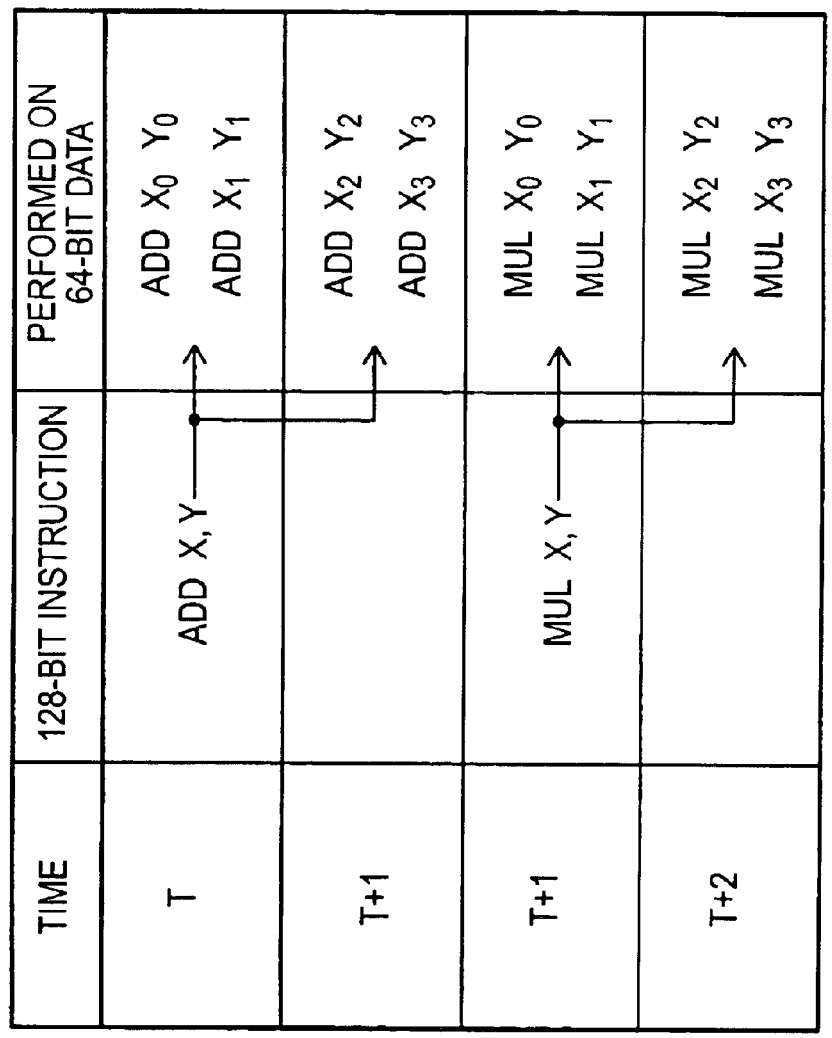
FIG. 4B is a timing chart that further illustrates the circuitry of FIG. 4A.

FIG. 4B is a timing chart that further illustrates the circuitry of FIG. 4A. More specifically, as illustrated in FIG. 4B, when instruction "ADD X, Y" is issued at time T, the two ADD execution units first perform ADDs on the lower order data segments or the lower two packed data elements of FIG. 1, namely $X_0Y_0$ and $X_1Y_1$. At time T+1, the ADD operation is performed on the remaining two data elements from the operands, by the same execution units, and the subsequent two data elements of the higher order data segment are added, namely $X_2Y_2$ and $X_3Y_3$. While the above embodiment is described with reference to ADD and MUL operations using two execution units, alternate embodiments may use any number of execution units and/or execute any number of different operations in a staggered manner.

According to this embodiment, 64-bit hardware may be used to process 128-bit data. A 128-bit register may be broken into four 32-bit elements, each of which represents a separate 32-bit value. At time T, the two ADD execution units perform ADDs first on the two lower 32-bit values, followed by an ADD on the higher 32-bit values at time T+1. In the case of a MUL operation, the MUL execution units behave in the same manner. This ability to use currently available 64-bit hardware to process 128-bit data represents a significant cost advantage to hardware manufacturers.

As described above, the ADD and MUL execution units according to the present embodiment are reused to reexecute a second ADD or MUL operation at a subsequent clock cycle. In order for this re-using or "staggered execution" to perform efficiently, this embodiment takes advantage of the statistical behavior of multimedia applications. More specifically, as described above, this embodiment takes advantage of statistical analysis showing that multimedia applications utilize approximately fifty percent ADD instructions and fifty percent MUL instructions. Based on these statistics, this embodiment assumes that multimedia instructions generally follow the following pattern: ADD, MUL, ADD, MUL, etc.

At time T+1, when the two ADD execution units are performing the second ADD operation on the two data elements of the higher order data segment, the two MUL units may begin a multiply operation. The first two data elements of the MUL, i.e. the lower order data segment, may be multiplied at time T+1 by the two MUL units, followed at time T+2 by the MUL units reexecuting the MUL operation on the two packed data elements of the higher order data segment. In this manner, according to one embodiment of the present invention, the number of ADD and MUL execution units are reduced by half, while maintaining the same or comparable performance as before.

If, however, a second ADD instruction follows the first, the second ADD instruction may be delayed by a scheduling unit to allow the ADD execution units to complete the first ADD instruction, or more specifically on the higher order data segment of the first ADD instruction. The second ADD instruction may then begin executing. Alternatively, in an out-of-order processor, the scheduling unit may determine that a MUL instruction further down the instruction stream may be performed out-of-order. If so, the scheduling unit may inform the MUL execution units to begin processing the MUL instruction. If no MUL instructions are available for processing at time T+1, the scheduler will not issue an instruction following the first ADD instruction, thus allowing the ADD execution units time to complete the first ADD instruction before beginning the second ADD instruction.

Yet another embodiment of the present invention allows for back-to-back ADD or MUL instructions to be issued by re-executing the instruction on the same execution units on a half clock cycle instead of a full clock cycle. Reexecuting the instruction on the half clock cycle effectively "double pumps" the hardware, i.e. makes the hardware twice as fast. In this manner, the ADD or MUL execution units may be available during each clock cycle to execute a new instruction. Double pumped hardware would allow for the hardware units to execute twice as efficiently as single pumped hardware that executes only on the full clock cycle. Double pumped hardware requires significantly more hardware, however, to effectively process the instruction on the half clock cycle.

Figure 5:
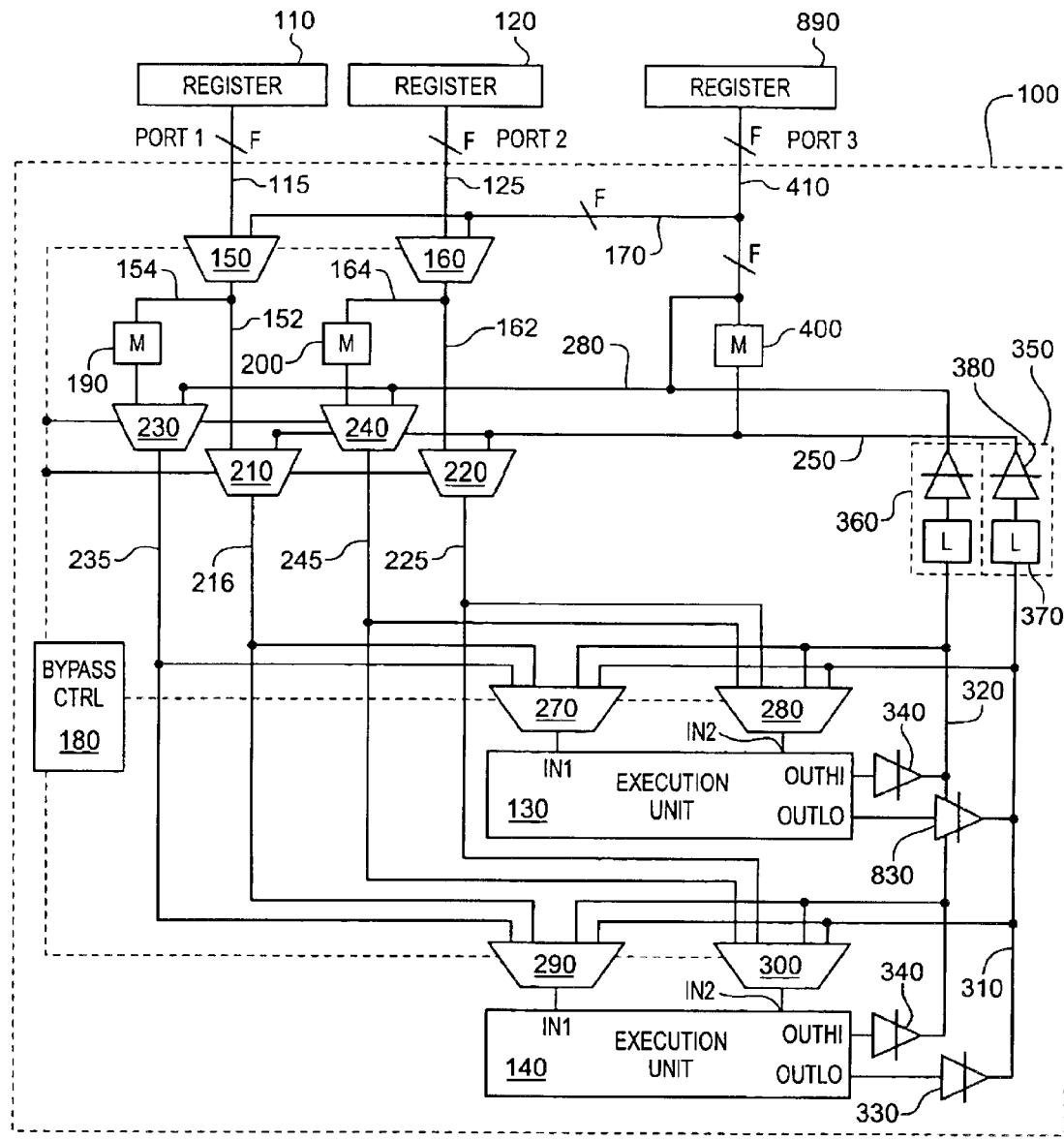
FIG. 5 illustrates the circuit of FIG. 4 with bypassing according to one embodiment of the invention.

FIG. 5 illustrates the circuit of FIG. 4A including bypassing functionality according to one embodiment of the invention. The bypassing according to this embodiment may be implemented in addition to the "staggered execution" functionality described above. The circuitry of FIG. 5 is in communication with two source registers and a destination register according to the techniques described above. As is typical, the registers are selectively addressed by control logic (not shown). Thus, in one macro instruction, the circuitry can read operands from the two registers and write a result to the third register. The registers store data of a predetermined width, such as 128 bits. The input data is read via the full width data lines 115 and 125 respectively. In the illustration of FIG. 5, all data lines should be considered half width parallel data lines unless marked otherwise. Full width, parallel data lines are designated as such by the marking "\F".

FIG. 5 additionally shows execution units 130 and 140 that perform operations on half the width of the operands retrieved from the source registers. Although two execution units are shown in FIG. 5, more or fewer execution units may be provided consistent with embodiments of the present invention. To perform full width calculations, the full width input data is divided into two half-width segments and input to a logic unit sequentially. The circuitry of FIG. 5 provides a first switching stage including switches 150 and 160. The switches 150 and 160 output data from a selected one of a plurality of inputs. Data line 115 is a first input to switch 150. Data line 125 is a first input to switch 160. Switches 150 and 160 both receive data lines 170, a "write-back bypass bus," as a second input. The switches 150 and 160 independently select an input under control of a bypass controller 180. The switches 150 and 160 receive and output data as a full width signal.

The full width output of the switches 150 and 160 are split into half width data elements. Data lines 152 and 162 respectively carry low order data output from the switches 150 and 160. Data lines 154 and 164 carry high order data. Data lines 154 and 164 are input to delay elements 190, 200 respectively. Delay elements 190 and 200 delay input data by a full clock cycle. Thus, high order data propagates through the circuitry one clock cycle delayed with respect to the low order data. In one embodiment, the delay elements 190 and 200 may be master slave flip flops.

According to one embodiment, the circuitry provides a second switching stage populated by switches 210–240. Switch 210 receives low data output from switch 150; switch 230 receives high data output from switch 150. Switch 220 receives low data output from switch 160; switch 240 receives high data output from switch 160. Switches 210 and 220 both receive data from data lines 250, a "low order global bypass bus," as a second input. Switches 230 and 240 both receive data from data lines 260, a "high order global bypass bus," as a second input. The switches 210–240 output the data of the selected input on data lines 215, 225, 235 and 245 respectively, which propagates to a third switching stage. Each switch 210–240 switches to a selected input independently of each other switch under control of the bypass controller 180.

Each execution unit 130 or 140 typically receives inputs at two input terminals IN1 and IN2. Input data arrives at each input terminal via the third stage of switching. The third stage provides a pair of switches for each execution unit. Thus, a pair of switches 270 and 280 is provided for logic unit 130 and a second pair of switches 290 and 300 is provided for logic unit 140. Each switch in the third stage selects from one of four inputs, organized as two pairs. Consider switch 270 as an example. A first pair of data inputs originate from the low and high data switches 210, 230 of the second stage. A second pair of inputs are received from data lines 310 and 320, a "low local bypass bus" and a "high local bypass bus", respectively. Similarly, switch 300 receives a first pair of inputs from second stage switches 220, 240 and a second pair of inputs from the low and high local bypass buses 310, 320.

For each execution unit 130, 140, the switches associated with the IN1 terminal derive their inputs from the same source. Thus, the inputs to switch 290 are identical to the inputs to switch 270. Also, the switches associated with the IN2 terminal derive their inputs from the same source. Inputs to switch 300 are identical to the inputs to switch 280. Although the inputs are identical, the switches 270–300 may be controlled independently.

Execution units 130 and 140 generate output data as two half width data segments. Low order data is output at an OUTLO terminal. High order data is output one clock cycle later at an OUTHI terminal. The low and high order output data propagate through separate drivers 330 and 340 to the low and high local bypass buses 310 and 320 respectively. Thus, low order output data may be input to any logic unit the next cycle after it is generated. The high order output data, generated one clock cycle later, may be input to any logic unit the cycle after it is generated. Thus, there is no delay associated with the local bypass.

Data on the each of the low and high local bypass buses 310 and 320 propagates through delay elements 350 and 360 to the low and high global bypass buses 250 and 260 respectively. Each delay element 350, 360 may include a latch 370 and a driver 380. Data input to a delay element 350, 360 appears on its output with a one clock cycle delay. Thus, data appears on the low and high global bypass buses 250, 260 one clock cycle after it appeared on the respective local bypass busses 310, 320.

As noted, the global bypass buses 250, 260 are input to the second stage switches 210–240. Low order data arrives to the global bypass bus 260 one clock cycle before the associated high order data arrives at the high global bypass bus 250. If either pair of the second stage switches 210–240 are switched to accept data from the global bypass buses as an input, the global bypass data may be bypassed back to the logic units 130, 140.

Data propagates from the global bypass buses 250, 260 back to a resultant register 390 over data lines 410. Resultant register 390 is a register that possesses the full width of data registers 110 and 120. Data is written to the resultant register 390 using full width, parallel data lines. A master slave flip flop 400 bridges the low order global bypass bus 250 to data lines 410. Data lines 410 are full width, parallel data lines. Flip flop 400 delays the low order data lines for one clock cycle to permit data to become established on the high order global bypass bus 260. When such data becomes available, low and high order data may be written to the resultant register 390 simultaneously.

The write bypass bus 170 allows data being written to the resultant register 390 to bypass back to the first stage of switches 150, 160. Thus, data may be redirected back to the execution unit 130 from the write bypass bus 170 by switching one of the first switches 150, 160 to output data from the write bypass bus 170. Data that flows to the execution unit 130 through the write bypass bus 170 is clocked into the execution unit three clock cycles after having been generated at the output terminal OUTLO.

A bypass controller 180 is provided in communication with the switches of all three switching stages. Bypass controller 180 monitors instructions issued by the microprocessor core (not shown). The bypass controller 180 configures the switching of each switch to implement any desired bypass. When the bypass controller 180 receives an instruction from the core, it determines whether the input data from the new instruction is resident on any bypass bus in the system. Consider an example where the core issues the following instructions:

PADD A,B Ø C,
PSHFT A, C Ø D
PXOR A, C Ø E, and
PSUB A,C Ø F

Also assume that execution unit 130 selectively performs the PADD, PXOR or PSUB functions and execution unit 140 performs the PSHFT function. The result, labeled "C" generated from the PADD function is an input to each of the following three instructions. The bypass architecture advantageously routes the C value back to inputs of the execution units without having to write data to register 390 and read it back to the circuitry.

The bypass controller 180 maintains a three register memory (not shown). One register, a local bypass register, is associated with the low local bypass bus 310. A second register, a global bypass register, is associated with the low order global bypass bus 250. The third register, a write back bypass register, is associated with the write-back bypass bus 170. Labels of data present on each bypass bus are stored in a corresponding register in the bypass controller 180.

Each time a new instruction is to be executed by the circuitry of FIG. 5, the bypass controller 180 compares the labels of the input data against the labels stored in its three registers. The bypass controller 180 detects a match when data to be input to the instruction is present on one of the bypass buses. If a match is detected, the bypass controller 180 causes the switching stages to route the data to the appropriate input of the appropriate execution unit. The bypass controller 180 need only track the data present on the low order bypass buses. When it determines to bypass data from one of the low order bypass buses, it will automatically bypass data from the associated high order bypass bus one clock cycle later.

The following table explains how the bypass controller 180 performs its monitoring function. At clock cycle T, the PADD function is performed, generating a result that is to be stored in destination register 390 labeled register "C". The bypass controller 180 stores a label for C in a memory register associated with the local bypass for low order data.

| Clock: T + 1 PSHFT A, C -> D | | Clock: T + 2 PXOR A, C -> E | | Clock: T + 3 PSUB A, C -> F | |
|---|---|---|---|---|---|
| Register Contents | Inputs/ Match? | Register Contents | Inputs/ Match? | Register Contents | Inputs/ Match? |
| Local C | A C x \| | Local D | A C x x | Local E | A C x x |
| Global | A C x x | Global C | A C x \| | Global D | A C x x |

-continued

| Clock: T + 1 PSHFT A, C -> D | | Clock: T + 2 PXOR A, C -> E | | Clock: T + 3 PSUB A, C -> F | |
|---|---|---|---|---|---|
| Register Contents | Inputs/ Match? | Register Contents | Inputs/ Match? | Register Contents | Inputs/ Match? |
| Write Back | A C x x | Write Back | A C x x | Write Back C | A C x \| |

At clock cycle T+1, the core issues the PSHFT instruction. The bypass controller 180 compares its local, global and write back buses against the designated inputs of the PSHFT command, A and C. A match is detected at the register associated with the local bypass bus 310. Accordingly, the bypass controller 180 causes a local bypass to be effected. In this case, switch 300 selects the local bypass bus 310 to bypass C back to the PSHFT execution unit 140.

At clock cycle T+2, the data within the bypass controller 180 registers are advanced to correspond to the movement of data from bypass bus to bypass bus. The label for C moves to the register associated with the global bypass bus 250; the label for D is input to the register associated with the local bypass bus 310. To cause the high order data to follow the low order data for the PSHFT instruction, the bypass controller 180 causes switch 300 to select the local bypass for high order data 320 as an input.

When the core issues the PXOR instruction, the bypass controller 180 again compares its registers against the designated inputs of the PXOR instruction, A and C. A match is detected at the register associated with the global bypass 250. Accordingly, the bypass controller 180 causes a global bypass to be effected. Here, switch 220 selects the global bypass bus 250 and switch 280 selects data line 225. The data from the low order global bypass bus 250 is routed back to logic unit 130.

At clock cycle T+3, the data within the bypass controller 180 registers advance again in a manner corresponding to the advance of data. The label for C moves to the register associated with the write back, bypass bus 170, the label for D moves to the global bypass register and the label for E is written into the local bypass register. The bypass controller 180 causes switch 240 to select the high order global bypass bus 260 to bypass the high order data to logic unit 140 to complete the PXOR instruction.

When the core issues the PSUB instruction, the bypass controller 180 performs the comparison and detects a match at the write back bypass bus 170. The bypass controller 180 causes switch 160 to select write back bypass bus 170, switch 220 to selects data lines 162 and switch 280 to select data line 1225. For clock cycles T+4 and beyond, if C were designated as an input to an instruction, it would be read from register 390 according to conventional processes.

Bus contentions may be encountered among sequential operations to be performed by a single execution unit. Using the example of Table 1 again, consider what would occur if the core issued a PADD instruction at clock cycle T+4. Execution unit 130 performs PADDs. At cycle T+4, however, the bypass controller 180 bypasses high order data from the delay latch 200 to execution unit 130 to complete the PSUB instruction of cycle T+3. Execution unit 130 is busy completing the PSUB instruction. Accordingly, core schedulers account for the bus contention and delay issuing the PADD instruction until the execution unit 130 is no longer busy.

The bus contention noted above occurs only when high order data from a bypass bus and a new instruction must use the same logic unit such as unit 130 in the example above. If the new instruction were a PSHFT or another instruction the referenced any execution unit other than unit 130, no contention would occur. Thus, the bypass architecture of the embodiment of the present invention permits data to be input to two or more execution units simultaneously.

In one embodiment, the switches of the circuit may be multiplexer latches ("LMUX"). The LMUXes select one of a plurality of inputs and route data from the selected input to an output. The bypass bus architecture described above advantageously provides an architecture scheme that avoids unnecessary reading and writing of data between the microprocessor core and the execution units and also provides the desired "one UOP, two data" principle of the staggered execution.

It will be appreciated that modifications and variations of various embodiments of the present invention are covered by the above teachings and within the preview of the appended claims without departing from the spirit and intended scope of the embodiments of the present invention. For example, although only two execution units are described above, any number of logic units may be provided.

Second Exemplary Embodiment

According to an alternate embodiment of the present invention, the staggered execution of a full width operand is achieved by converting a full width macro operation into at least two micro instructions that each operate on only half of the operands. Although the description below is written according to a particular register renaming method, it will be appreciated that other register renaming mechanisms may also be utilized consistent with the embodiments of the present invention. The register renaming method as described below assumes the use of a Register Alias Table (RAT), a Reorder Buffer (ROB) and a retirement buffer, as described in detail in U.S. Pat. No. 5,446,912. Alternate register renaming methods such as that described in U.S. Pat. No. 5,197,132 may also be implemented.

Figure 6A:
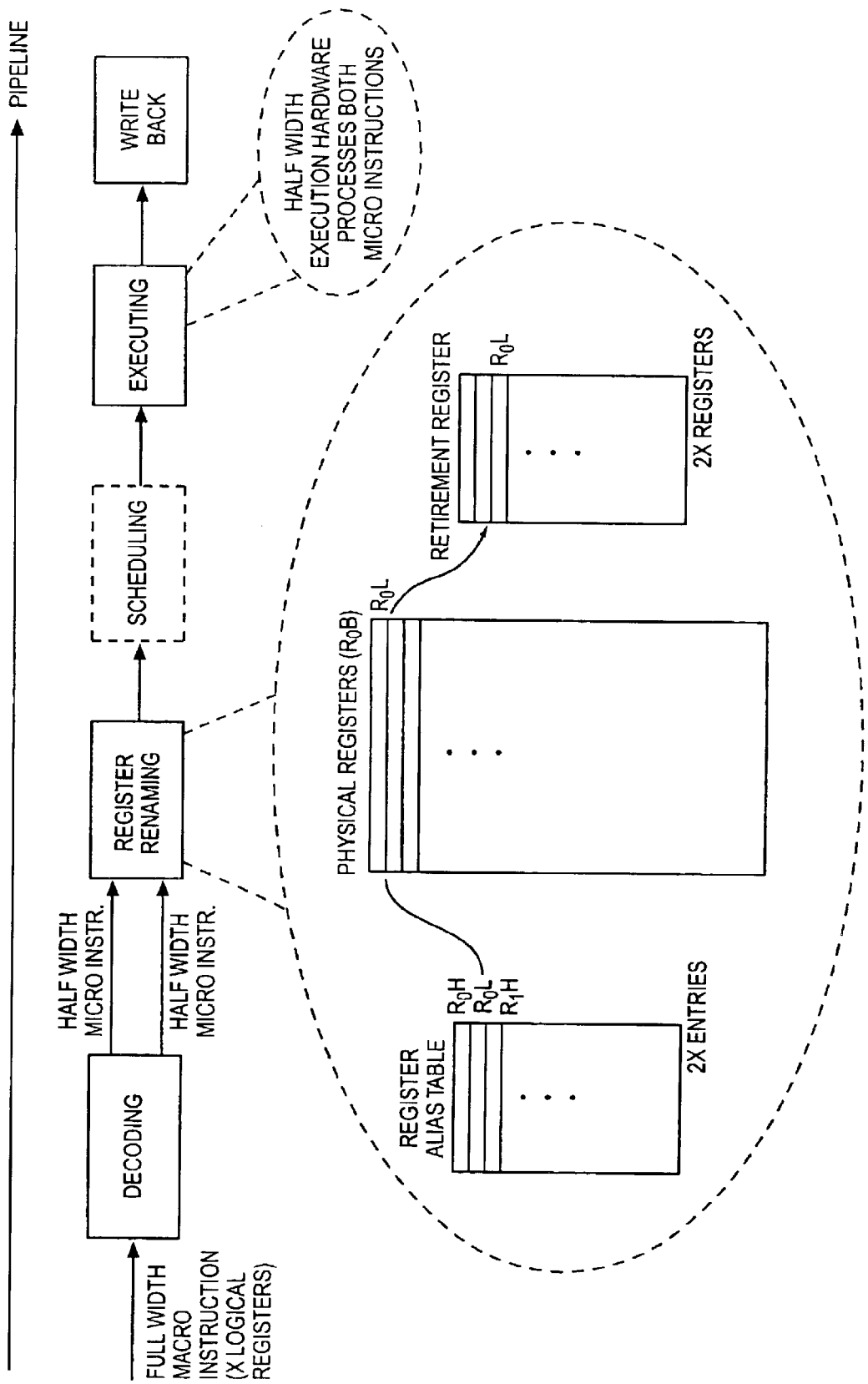
FIG. 6A illustrates conceptually one embodiment of an out-of-order pipeline to perform operations on operands in a "staggered" manner by converting a macro operation into a plurality of micro operations that each processes a portion of the full width of the operands.

FIG. 6A illustrates conceptually one embodiment of a pipeline to perform operations on operands in a "staggered" manner by converting a macro operation into a plurality of micro operations that each processes a portion of the full width of the operands. It should be noted that various other stages of the pipeline, e.g. a prefetch stage, have not been shown in detail in order not to unnecessarily obscure the embodiments of the present invention. As illustrated, at the decode stage of the pipeline, a full width macro instruction (e.g. 128-bit) is received, specifying logical source registers, each storing a full width operand. By way of example, the described operands are 128-bit packed floating point data operands. In this example, the processor supports Y logical registers for storing packed floating point data. The macro instruction is converted into two half width (e.g. 64-bit) micro instructions, namely a "high order operation" and a "low order operation." Each of the two half width micro instructions specifies a first and a second source and a destination.

The two half width micro instructions then move into a register renaming stage of the pipeline. The register renaming stage includes a variety of register maps and reorder buffers. The sources of each micro instruction are pointers to specific register entries in a register mapping table (e.g. a RAT). The entries in the register mapping table in turn point to the location of the sources in an ROB or in a retirement register. According to one embodiment, in order to accommodate the half width high and low order operations described above, a RAT for packed floating point data is provided with Y*2 entries. Thus, for example, instead of a RAT with the 8 entries, a RAT is created with 16 entries, each addressed as "high" or "low." Each entry identifies a 64-bit source corresponding to either a high or a low part of the 128-bit logical register.

Each of the high and low order micro instructions thus has associated entries in the register mapping table corresponding to the respective operands. The micro instructions then move into a scheduling stage (for an out of order processor) or to an execution stage (for an in order processor). Each micro instruction retrieves and separately processes a 64-bit segment of the 128-bit operands. One of the operations (e.g. the lower order operation) is first executed by the 64-bit hardware units and 64-bits of data (e.g. the 64 lower order bits) are retrieved and processed. The other operation (e.g. the higher order operation) waits until the 64-bit hardware units have completed the lower order operation. Then, the same 64-bit hardware unit executes the higher order operation, first retrieving another 64 bits of data (e.g. the higher order bits) to process. Although the above example describes the lower order operation and higher order operation being performed sequentially, the operations do not in fact have to be performed sequentially. Each operation is completely independent of the other, i.e. either operation may be performed first and any number of other operations may be performed in between these two operations. The results of the operation, however, are retired sequentially.

Although the above embodiment describes the macro instruction being divided into two micro operations, alternate embodiments may divide the macro instruction into more micro instruction. While FIG. 6A shows that the packed floating point data is returned to a real register file with Y*2 64-bit registers, each designated as high or low, alternate embodiments may use a real register file with Y 128-bit registers. In addition, while one embodiment is described having a register renaming mechanism with a reorder buffer and real register files, alternate embodiments may use any register renaming mechanism. For example, the register renaming mechanism of U.S. Pat. No. 5,197,132 uses a history queue and backup map.

Figure 6B:
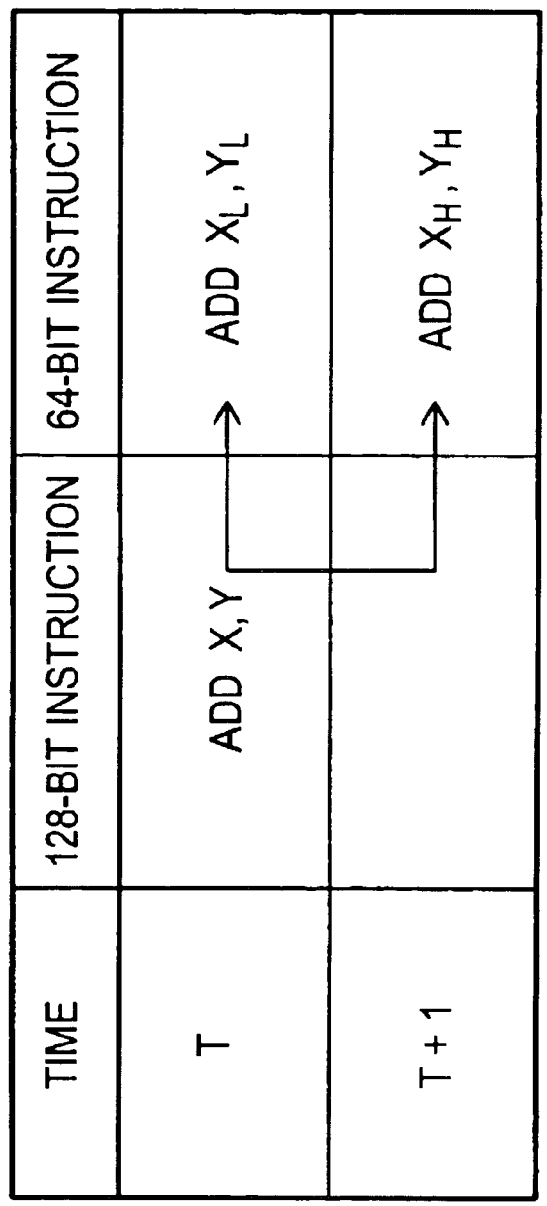
FIG. 6B is a timing chart that further illustrates the embodiment described in FIG. 6A.

FIG. 6B is a timing chart that further illustrates the embodiment described in FIG. 6A. At time T, a macro instruction "ADD X, Y" enters the decode stage of the pipeline of FIG. 6A. By way of example, the macro instruction here is a 128-bit instruction. The 128-bit macro instruction is converted into two 64-bit micro instructions, namely the high order operation, "ADD $X_H$, $Y_H$" and the low order operation, "ADD $X_L Y_L$." Each micro instruction then processes a segment of data containing two data elements. At time T, the low order operation is executed by a 64-bit execution unit. Then at time T+1, the high order operation is executed by the same 64-bit execution unit. This embodiment of the present invention is thus especially suitable for processing 128-bit instructions using existing 64-bit hardware systems without significant changes to the hardware. The existing systems are easily extended to include a new map to handle packed floating point, in addition to the existing scalar floating point/integer packed data map and scalar integer map.

Thus, a method and apparatus for staggering execution of an instruction is disclosed. These specific arrangements and methods described herein are merely illustrative of the embodiments of the present invention. Numerous modifications in form and detail may be made by those of ordinary skill in the art without departing from the scope of the embodiments of the present invention. Although various embodiments of the present invention have been shown in relation to a particular embodiment, it should not be considered so limited.

What is claimed is:

1. A method comprising:

receiving a single macro instruction specifying at least two logical registers, wherein the two logical registers respectively store first and second 128-bit packed data operands, each of the first and second 128-bit packed data operands have four 32-bit single precision floating point data elements; and independently performing an operation specified by the single macro instruction on a first and a second plurality of corresponding ones of the 32-bit single precision floating point data elements of the first and second 128-bit packed data operands, at different times, using the same circuit, to independently generate a first and a second plurality of resulting data elements, wherein the first and the second plurality of resulting data elements are stored in a single logical register as a third 128-bit packed data operand.

2. The method of claim 1, wherein said independently performing comprises:

accessing full widths of the first and second 128-bit packed data operands; splitting the full widths of each of the first and second 128-bit packed data operands into lower and higher halves that each include two 32-bit single precision floating point data elements; and delaying the higher halves of each of the first and second 128-bit packed data operands.

3. The method of claim 1, wherein said independently performing comprises:

converting the single macro instruction into a first micro instruction and a second micro instruction;

accessing lower halves of the first and second 128-bit packed data operands and performing an operation specified by the first micro instruction on each of two corresponding pairs of the 32-bit single precision floating point data elements of the lower halves; and accessing higher halves of the first and second 128-bit packed data operands and performing the operation specified by the second micro instruction on each of two corresponding pairs of the 32-bit single precision floating point data elements of the higher halves.

4. An apparatus comprising:

a register file to contain first and second 128-bit packed data operands, the first and the second 128-bit packed data operands including four pairs of corresponding 32-bit single precision floating point data elements; and a circuit coupled to the register file, the circuit in response to a single packed data instruction specifying an operation to: retrieve the corresponds data elements from the register file;

execute the operation in an execution unit on a lower order two of the four pairs of corresponding 32-bit single precision floating paint data elements to output a first result including two 32-bit single precision floating point data elements;

at a different time, execute the operation in the execution unit on a higher order two of the four pairs of corresponding 32-bit single precision floating point data elements to output a second result including two 32-bit single precision floating point data elements; and store the first and the second results in the register file as a third 128-bit packed data operand.

5. The apparatus of claim 4, further comprising:
ports of the circuit to receive full widths of the first and the second 128-bit packed data operands;
logic to divide the full widths of each of the first and the second 128-bit packed data operands into the lower and the higher order two; and
delay elements coupled with the logic to delay the higher order two.

6. The apparatus of claim 4, further comprising a decoder to convert the single packed data instruction into a first micro instruction that causes the lower order two to be accessed from the register file and a second micro instruction that causes the higher order two to be accessed from the register file.

7. A method comprising:
receiving a first packed data instruction, the first packed data instruction specifying logical registers in a 128-bit logical register file of a processor storing a first 128-bit packed data operand and a second 128-bit packed data operand, the first packed data instruction also specifying an operation to be performed on corresponding 32-bit single precision floating point data elements of the first and the second 128-bit packed data operands, each of the 128-bit packed data operands including a lower order half and a higher order half, each of the lower order half and the higher order half including two of the 32-bit single precision floating point data elements; and
performing the operation specified by the first packed data instruction on the corresponding 32-bit single precision floating point data elements of the lower order halves of the first and the second 128-bit packed data operands using a circuit; and
at a different time, performing the operation specified by the first packed data instruction on the corresponding 32-bit single precision floating point data elements of the higher order halves of the first and the second 128-bit packed data operands using the circuit.

8. The method of claim 7, further comprising:
receiving a second packed data instruction, the second packed data instruction specifying logical registers in the 128-bit logical register file of the processor storing a third 128-bit packed data operand and a fourth 128-bit packed data operand, the second packed data instruction also specifying an operation to be performed on corresponding 64-bit data elements of the third and the fourth 128-bit packed data operands, each of the third and the fourth 128-bit packed data operands including a lower order half and a higher order half, each of the lower order half and the higher order half of the third and the fourth 128-bit packed data operands including one of the 64-bit data elements; and
performing the operation specified by the second packed data instruction on the corresponding 64-bit data elements of the lower order halves of the third and the fourth 128-bit packed data operands asing the circuit; and
at a different time performing the operation specified by the second picked data instruction on the corresponding 64-bit data elements of the higher order halves of the third and the fourth 128-bit packed data operands using the circuit.

9. The method of claim 7:
wherein the circuit comprises a 64-bit execution unit; and
wherein the operation is one of ADD and MULTIPLY.

10. The method of claim 7, further comprising:
converting the first packed data instruction into at least a first micro instruction and a second micro instruction;
accessing the lower order halves of the first and the second 128-bit packed data operands from the logical registers responsive to the first micro instruction; and
accessing the higher order halves of the first and the second 128-bit packed data operands from the logical registers responsive to the second micro instruction.

11. The method of claim 7, further comprising, prior to said performing the operation, accessing full widths of the first and the second 128-bit packed data operands from the logical registers.

12. The method of claim 7, wherein the operation of the first packed data instruction comprises an ADD operation, and further comprising scheduling a second packed data instruction, which specifies a MULTIPLY operation, out-of-order so that it follows the first packed data instruction.

13. An apparatus comprising:
a plurality of physical registers to operate as a 128-bit logical register file of a processor;
a decoder to receive and decode instructions including a packed data instruction that specifies a first 128-bit packed data operand and a second 128-bit packed data operand by specifying logical registers in the 128-bit logical register file, each of the 128-bit packed data operands including a lower order half and a higher order half, each of the lower order half and the higher order half including two 32-bit single precision floating point data elements, the packed data instruction also specifying an operation to be performed on corresponding ones of the 32-bit single precision floating point data elements of the first and the second 128-bit packed data operands; and
an execution unit, coupled with the decoder, to execute the packed data instruction to generate a 128-bit packed data result operand by performance of the operation specified by the packed data instruction on the corresponding ones of the 32-bit single precision floating point data elements in the lower order halves of the first and the second 128-bit packed data operands, and, at a different time, performance of the operation specified by the packed data instruction on the corresponding ones of the 32-bit single precision floating point data elements of the higher order halves of the first and the second 128-bit packed data operands.

14. The apparatus of claim 13:
wherein the decoder is to receive and decode a second packed data instruction that specifies a third 128-bit packed data operand and a fourth 128-bit packed data operand by specifying logical registers in the 128-bit logical register file, each of the third and the fourth 128-bit packed data operands including a lower order half and a higher order half, each of the lower order half and the higher order half of the third and the fourth 128-bit packed data operands including a 64-bit data element, the second packed data instruction also specifying an operation to be performed on corresponding ones of the 64-bit data elements of the third and the fourth 128-bit packed data operands; and
wherein the execution units is to execute the second packed data instruction to generate a second 128-bit packed data result operand by performance of the operation specified by the second packed data instruction on the corresponding ones of the 64-bit single precision floating point data elements in the lower order halves of the third and fourth 128-bit packed data operands, and, at a different time, performance of the operation specified by the second packed data instruction on the corresponding ones of the 64-bit single precision floating point data elements of the higher order halves of the third and the fourth 128-bit packed data operands.

15. The apparatus of claim 13:
wherein the execution unit comprises a 64-bit execution unit;
wherein the operation is one of ADD and MULTIPLY; and
wherein the 128-bit packed data result operand is to be stored over the first 128-bit packed data operand.

16. The apparatus of claim 13, wherein the decoder is to convert the packed data instruction into at least a first micro instruction and a second micro instruction, wherein the first micro instruction causes the lower order halves of the first and the second 128-bit packed data operands to be accessed from the logical registers, and wherein the second micro instruction causes the higher order halves of the first and the second 128-bit packed data operands to be accessed from the logical registers.

17. The apparatus of claim 13, wherein the execution unit comprises logic to access full widths of the first and the second 128-bit packed data operands from the logical registers, and wherein the execution unit comprises delay elements to delay the higher order halves of the first and the second 128-bit packed data operands while performing the operation on the lower order halves of the first and the second 128-bit packed data operands.

18. The apparatus of claim 13, further comprising a scheduling unit, coupled between the decoder and the execution unit, to try to schedule packed data instructions that specify ADD and MULTIPLY operations on 128-bit single precision floating point operands out-of-order so that they alternate.

19. A method comprising:
receiving a single macro instruction that specifies an operation to be independently performed on corresponding 32-bit single precision floating point data elements from a first 128-bit packed data operand and a second 128-bit packed data operand to generate a third 128-bit packed data operand;
performing the operations on lower halves of the first and second 128-bit packed data operands at a different time than on upper halves of the first and second 128-bit packed data operands using the same hardware; and
storing results of the four operations as four 32-bit single precision floating point packed data elements of the third 128-bit packed data operand.

20. A method comprising:
receiving a packed data instruction specifying logical registers storing a first 128-bit packed data operand and a second 128-bit packed data operand;
accessing full widths of the first 128-bit packed data operand and the second 128-bit packed data operand from the logical registers;
splitting the full width of the first 128-bit packed data operand into a first 64-bit lower order segment and a first 64-bit higher order segment, the first 64-bit lower order segment and the first 64-bit higher order segment each having two 32-bit single precision floating point data elements;
splitting the full width of the second 128-bit packed data operand into a second 64-bit lower order segment and a second 64-bit higher order segment, the second 64-bit lower order segment and the second 64-bit higher order segment each having two 32-bit single precision floating point data elements;
generating a first result by using a circuit to perform an operation specified by the packed data instruction on corresponding ones of the 32-bit single precision floating point data elements of the first 64-bit lower order segment and the second 64-bit lower order segment; and
at a different time, generating a second result by using the circuit to perform the operation specified by the packed data instruction on corresponding ones of the 32-bit single precision floating point data elements of the first 64-bit higher order segment and the second 64-bit higher order segment.

21. An apparatus comprising:
a first port to receive a full width of a first 128-bit packed data operand from a logical register specified by a packed data instruction, the first 128-bit packed data operand having four 32-bit single precision floating point data elements;
a second port to receive a full width of a second 128-bit packed data operand from a logical register specified by the packed data instruction, the second 128-bit packed data operand also having four 32-bit single precision floating point data elements;
a first circuit coupled with the first port to receive the full width of the first 128-bit packed data operand and to split the first 128-bit packed data operand into a first 64-bit lower order half and a first 64-bit higher order half;
a second circuit coupled with the second port to receive the full width of the second 128-bit packed data operand and to split the second 128-bit packed data operand into a second 64-bit lower order half and a second 64-bit higher order half;
a first delay element coupled with the first circuit to receive and delay the first 64-bit higher order half;
a second delay element coupled with the second circuit to receive and delay the second 64-bit higher order half;
an execution unit coupled with the first circuit, the second circuit, the first delay element, and the second delay element, the execution unit to perform an operation specified by the packed data instruction on corresponding ones of the 32-bit single precision floating point data elements of the first and the second 64-bit lower order halves, and, after a delay to perform the operation specified by the packed data instruction on corresponding ones of the 32-bit single precision floating point data elements of the first and the second 64-bit higher order halves.

22. A method comprising:
receiving a packed data instruction specifying logical registers having a first 128-bit packed data operand having four 32-bit single precision floating point data elements and a second 128-bit packed data operand having four 32-bit single precision floating point data elements;
converting the packed data instruction into a first micro instruction and a second micro instruction;
retrieving lower order halves of the first and the second 128-bit packed data operands specified by the first micro instruction, each of the lower order halves having two 32-bit single precision floating point data elements;

generating a first result by asing hardware to perform an operation specified by the packed data instruction on corresponding ones of the 32-bit single precision floating point data elements of the lower order halves of the first and the second 128-bit packed data operands;

retrieving higher order halves of the first and the second 128-bit packed data operands specified by the second micro instruction, each of the higher order halves having two 32-bit single precision floating point data elements;

generating a second result by using the hardware to perform an operation specified by the packed data instruction on corresponding ones of the 32-bit single precision floating point data elements of the higher order halves of the first and the second 128-bit packed data operands;

writing the first and the second results to a 128-bit logical register specified by the packed data instruction.

23. An apparatus comprising:

a decoder to receive a packed data instruction, the packed data instruction specifying logical registers having a first 128-bit packed data operand and a second 128-bit packed data operand, each of the first and the second 128-bit packed data operands having four 32-bit single precision floating point data elements, the decoder to convert the packed data instruction into at least a first micro instruction and a second micro instruction;

an execution unit coupled with the decoder to execute the first micro instruction, and, at a different time, to execute the second micro instruction, in the execution of the first micro instruction the execution unit to retrieve lower order halves of the first and the second 128-bit packed data operands and to perform an operation specified by the packed data instruction on corresponding ones of the 32-bit single precision floating point data elements in the lower order halves, and in the execution of the second micro instruction the execution unit to retrieve higher order halves of the first and the second 128-bit packed data operands and to perform the operation specified by the packed data instruction on corresponding ones of the 32-bit single precision floating point data elements in the higher order halves.

24. A method comprising:

receiving a first packed data instruction specifying logical registers that respectively store a first 128-bit packed data operand and a second 128-bit packed data operand, each of the first and the second 128-bit packed data operands having four 32-bit single precision floating point data elements, the first packed data instruction specifying an ADD operation on the first and the second 128-bit packed data operands;

receiving a second packed data instruction specifying logical registers that respectively store a third 128-bit packed data operand and a fourth 128-bit packed data operand, each of the third and the fourth 128-bit packed data operands having four 32-bit single precision floating point data elements, the second packed data instruction specifying a MULTIPLY operation on the third and the fourth 128-bit packed data operands;

at a first time, performing the ADD operation specified by the first packed data instruction on corresponding ones of the 32-bit single precision floating point data elements in lower order halves of the first 128-bit packed data operand and the second 128-bit packed data operand using an ADD execution unit;

at a second time, which is different than the first time, performing the ADD operation specified by the first packed data instruction on corresponding ones of the 32-bit single precision floating point data elements in higher order halves of the first 128-bit packed data operand and the second 128-bit packed data operand using the ADD execution unit;

at the second time, performing the MULTIPLY operation specified by the second packed data instruction on corresponding ones of the 32-bit single precision floating point data elements in lower order halves of the third 128-bit packed data operand and the fourth 128-bit packed data operand using a MULTIPLY execution unit; and at a third time, which is different than the second time, performing the MULTIPLY operation specified by the second packed data instruction on corresponding ones of the 32-bit single precision floating point data elements in higher order halves of the third 128-bit packed data operand and the fourth 128-bit packed data operand using the MULTIPLY execution unit.

25. The method of claim 24, further comprising executing code having instructions with operations arranged in the pattern ADD, MULTIPLY, ADD, MULTIPLY.

26. The method of claim 24, further comprising scheduling packed data instructions out-of-order so that packed data instructions specifying MULTIPLY operations are interleaved with packed data instructions specifying ADD operations.

* * * * *

UNITED STATES PATENT AND TRADEMARK OFFICE
CERTIFICATE OF CORRECTION

PATENT NO. : 6,925,553 B2
DATED : August 2, 2005
INVENTOR(S) : Roussel et al.

It is certified that error appears in the above-identified patent and that said Letters Patent is hereby corrected as shown below:

Column 12,
Line 54, delete "corresponds" and insert -- corresponding --.
Line 58, delete "paint" and insert -- point --.

Column 13,
Line 58, delete "asing" and insert -- using --.

Signed and Sealed this

Eleventh Day of October, 2005

JON W. DUDAS
*Director of the United States Patent and Trademark Office*